Patented Aug. 4, 1942

2,291,988

UNITED STATES PATENT OFFICE 2,291,988

METHOD OF IMPROVING THE PHYSICAL PROPERTIES OF RUBBER

Robert L. Sibley, Nitro, W. Va., assignor to Monsanto Chemical Company, St. Louis, Mo., a corporation of Delaware No Drawing. Application June 9, 1938,
Serial No. 212,773

14 Claims. (Cl. 260—757)

The present invention relates to a method of improving the physical properties of rubber whereby a new and useful product is obtained. More particularly this invention relates to a method of treating rubber whereby sunchecking is materially retarded. The rubber products so obtained are likewise a subject of the present invention.

In addition to the valuable property of inhibiting sunchecking possessed generally by the compounds of the present invention as hereinafter disclosed, their use effects other valuable improvements in the physical properties of rubber, as for example softening of the uncured rubber. Other and further useful improvements will be hereinafter shown.

It is a common observation that rubber articles which have been exposed to direct sunlight for extended periods of time exhibit a multitude of cracks or checks which may range from surface failures barely perceptible to the naked eye to large cracks or checks which seriously impair the utility of the rubber article. This phenomenon is commonly referred to as "sunchecking" and it is obvious that its prevention is highly desirable. It is an object of the present invention to materially retard sunchecking by treating rubber with a preferred class of materials.

Other and further objects will be hereinafter shown.

In accordance with the present invention it has been discovered that diphenyl, either unsubstituted or nuclear substituted by one or more groups selected from a class consisting in hydrocarbon groups, nitro groups and halogen groups, possess anti-sunchecking and other valuable properties.

Among the materials included within the scope of the invention are diphenyl, m-phenyl diphenyl, p-phenyl diphenyl, poly ethylated diphenyl, propylated diphenyl, o-nitro diphenyl, deca chlor diphenyl and analogues and equivalents thereof.

The manner in which the preferred class of compounds function to retard the formation of sunchecks is not known and the present invention is in nowise limited to any theory regarding their mode of action. It is reasonable to assume, however, that certain of the desirable properties exhibited by the preferred class of compounds are due at least in part to their property of "blooming" or forming on the surface of the rubber a film which protects the surface. It is well known that rubber may be protected by applying to the surface thereof various protecting agents and if convenient or desirable the preferred class of materials of the present invention may be so employed. It is preferred, however, to incorporate them into the rubber proper in order to take advantage of their useful softening properties and furthermore by incorporating them directly into the rubber the surface of the rubber product is more efficiently protected. As one surface is worn away each succeeding fresh surface is protected by a thin film of the diphenyl which had been incorporated in the rubber since a further portion separates on the newly formed surface, whereas in the case of materials applied only to the surface, all protecting action is lost once the original surface is worn away. Diphenyl and substituted diphenyls are colorless compounds and exhibit no objectionable discoloration of the rubber, but on the contrary produce an improved surface finish.

As a specific embodiment of the invention which is intended to illustrate the anti-sunchecking properties of the preferred class of materials but in nowise to limit the invention, rubber stocks were compounded comprising

| | Stock | | |
|---|---|---|---|
| | A | B | C |
| | Parts by weight | Parts by weight | Parts by weight |
| Pale crepe | 100 | 100 | 100 |
| 10% Ultra Marine Blue, Master | 5 | 5 | 5 |
| Zinc oxide | 3 | 3 | 3 |
| Lithopone | 2 | 2 | 2 |
| Sulfur | 2 | 2 | 2 |
| Benzothiazyl thiobenzoate | 0.8 | 0.8 | 0.8 |
| Diphenyl guanidine | 0.2 | 0.2 | 0.2 |
| Deca chlordiphenyl | | 0.5 | |
| Diphenyl | | | 0.5 |

The rubber stocks so compounded were vulcanized by heating in a press at the temperature of forty pounds steam pressure per square inch and after curing were placed in the Geer oven at 70° C. to condition and bring out any bloom. Pieces were elongated 10% and 25% and exposed to the direct rays of the sun for about thirty days and the surface of the stock containing none of the preferred class of materials (A) compared with the stocks containing small proportions of the new anti-suncheckers. It was found that stock A was very badly checked and cracked whereas the surfaces of stocks B and C were markedly less checked or cracked.

In order to further illustrate the desirable anti-sunchecking properties of the preferred class of materials and to demonstrate more fully the advantages accompanying their use, rubber stocks were compounded comprising

|  | Parts by weight | | | | | |
|---|---|---|---|---|---|---|
| Pale crepe | 100 | 100 | 100 | 100 | 100 | 100 |
| Zinc oxide | 60 | 60 | 60 | 60 | 60 | 60 |
| Lithopone | 20 | 20 | 20 | 20 | 20 | 20 |
| Sulfur | 2 | 2 | 2 | 2 | 2 | 2 |
| Benzothiazyl thiobenzoate | 0.825 | 0.825 | 0.825 | 0.825 | 0.825 | 0.825 |
| Diphenyl guanidine phthalate | 0.675 | 0.675 | 0.675 | 0.675 | 0.675 | 0.675 |
| Paraffin | 0.25 | 0.25 | 0.25 | 0.25 | 0.25 | 0.25 |
| Diphenyl | | 1.0 | | | | |
| Diphenyl high boiler | | | 1.0 | | | |
| Polyethylated diphenyl | | | | 1.0 | | |
| Para diphenyl benzene | | | | | 1.0 | |
| Deca chlor diphenyl | | | | | | 1.0 |

The stocks so compounded were vulcanized by heating in a press at the temperature of 20 pounds steam pressure per square inch. Portions of the cured rubber product were elongated 25% and exposed to the direct rays of the sun until the stocks containing the preferred materials attained the same degree of sun checking as the control stock. It was found that the stocks containing the preferred class of materials all exhibited a substantial improvement over the control stock (stock containing no anti-sunchecking material) in their resistance to sunchecking. Table I shows the increase in resistance to sunchecking of the stocks containing the preferred class of materials over the control. The diphenyl high boiler referred to in the table is the residue from the distillation of diphenyl. Said residue comprises mainly phenyl diphenyls which will be hereinafter referred to as "diphenyl high boiler."

*Table I*

| Material tested | Increase in resistance to sunchecking over control |
|---|---|
| | Per cent |
| Diphenyl | 40 |
| Diphenyl high boiler | 40 |
| Polyethylated diphenyl | 33 |
| Para diphenyl benzene | 26 |
| Deca chlor diphenyl | 30 |

The above data show that by the incorporation of small amounts of the preferred class of materials into rubber stocks the formation of sunchecks is materially retarded.

In a preferred embodiment of the present invention the preferred class of materials are employed in conjunction with hydrocarbon waxes as for example paraffin. As a specific example of a preferred embodiment of the present invention, rubber base stocks were compounded comprising

| Pale crepe | 100. |
|---|---|
| Zinc oxide | 63.5 |
| Zinc sulfide | 31.75 |
| Benzothiazl thiobenzoate | 0.4 |
| Diphenyl guanidine phthalate | 0.3 |
| Ultra marine blue | 0.025 |
| Stearic acid | 0.5 |
| Sulfur | 2.48 | into which were incorporated small proportions of the preferred class of materials alone and in conjunction with paraffin as hereinafter shown, and the stocks so compounded were exposed to Florida sunlight until all the stocks exhibited sunchecking. Comparisons were then made on the basis of the number and size of the cracks. The stock containing 1% by weight of diphenyl was taken as the control stock and the percent improvement over control noted. The comparisons are summarized in the following table where the stock containing diphenyl is arbitrarily rated 100. Thus the figure 110 means a 10% improvement over diphenyl.

*Table II*

| Material employed | Amount per cent of the total | Rating |
|---|---|---|
| Diphenyl | 1 | 100 |
| 1 part diphenyl+1 part paraffin | 1 | 110 |
| Diphenyl | 2 | 110 |
| 1 part diphenyl+1 part paraffin | 2 | 130 |
| 1 part diphenyl+0.25 part paraffin | 1.25 | 150 |
| Diphenyl high boiler | 2 | 110 |
| 1 part diphenyl high boiler+1 part paraffin | 2 | 130 |

The above data illustrate the preferred embodiment of the invention in accordance with which the preferred class of materials are employed in conjunction with hydrocarbon waxes and show the improved results obtained thereby. It will be noted that optimum results are obtained with a relatively small proportion of hydrocarbon wax.

The desirable softening properties of the preferred class of materials may be demonstrated in a variety of ways as for example by comparing the plasticity data of the uncured rubber stocks containing one of the preferred class of materials with an uncured rubber stock containing none of the preferred materials by means of a Williams plastometer described by Williams, Industrial and Engineering Chemistry, vol. 16, p. 362 (1924)—see also Krall, ibid, vol. 16, page 922 (1924). The softening is evident when one of the preferred class of materials is incorporated into rubber during the milling operation. The actual extent of the softening may be most conveniently determined by measuring the power consumed in the milling operation as against the power consumed in milling rubber containing none of the preferred class of materials. As a specific illustration the power consumed during the milling of 100 parts by weight of smoked sheets was measured and compared with the power consumed in milling, for the same length of time, 100 parts by weight of smoked sheets to which was added 3 parts by weight of one of the preferred class of materials. After standing ten days the power consumption during a remilling of the rubber was measured. The results obtained from such tests are illustrated in the following table.

*Table III*

| | Original milling | Rebreak after ten days |
|---|---|---|
| | Kwh. | Kwh. |
| Control: 100 parts by wt. of smoked sheets | 9.191 | 3.051 |
| Control+3.0 parts by wt. of diphenyl high boiler | 6.144 | 1.922 |
| Control+3.0 parts by wt. of polyethylated diphenyl | 6.007 | 1.908 |

The above data show the softening properties of the preferred class of materials when incorporated with smoked sheets of rubber. The same desirable results are obtained with rubber stocks further compounded. For example rubber stocks were compounded comprising

|  | Stock | |
|---|---|---|
|  | D | E |
|  | Parts by weight | Parts by weight |
| Smoked sheets | 100 | 100 |
| Zinc oxide | 5 | 5 |
| Sulfur | 3.5 | 3.5 |
| Diphenyl guanidine | 0.75 | 0.75 |
| Diphenyl | 3.0 | |

The power consumed in milling the above described stocks was measured and eight days later the second milling or rebreak was made and seven days after the second milling a third milling was made, the power consumed being measured in each case. The results are given in Table IV where the figures are the meter readings less the mill constant in kilowatt hours.

*Table IV*

| Stock | 1st milling | 2d milling | 3d milling |
|---|---|---|---|
|  | Kwh. | Kwh. | Kwh. |
| D | 4.572 | 0.664 | 0.388 |
| E | 5.051 | 1.911 | 1.071 |

The above data show the softening properties of the preferred class of materials when incorporated in a vulcanizable rubber stock. Other diphenyl compounds than those specifically shown above have likewise been employed as softeners and found to have marked effect on the softening and plasticizing of rubber. Thus, propylated diphenyl and nitro diphenyl have been so employed. In addition it has been found that the incorporation of the preferred class of materials in vulcanizable rubber compositions with subsequent vulcanization does not materially affect the modulus and tensile properties of the cured rubber products nor are the aging properties adversely affected. Rubber stocks containing typical examples of the preferred class of materials as for example diphenyl and diphenyl high boiler were vulcanized and aged in an air bomb at 250° F. and at 80 pounds air pressure and 50% elongation for four and six hours, a procedure thoroughly familiar to those skilled in the art of rubber compounding. The modulus and tensile properties of the aged and unaged stocks containing small proportions of the preferred class of materials were compared with the modulus and tensile properties of the same aged and unaged stock containing none of the preferred class of materials and it was found thereby that the preferred class of materials did not adversely affect the aging properties of the rubber but did on the contrary exhibit some antioxidant properties due, it is believed, to their property of protecting the surface. The preferred class of materials may thus be employed in a rubber stock as the sole antioxidant or they may advantageously be employed in conjunction with antioxidants of a different class. The plastometer figures obtained as described above further showed the desirable softening properties of the preferred class of compounds.

From the specific examples and data hereinbefore set forth it is shown that rubber compositions containing small proportions of the preferred class of materials exhibit improved physical properties and more particularly are resistant to sunchecking and in addition the uncured rubber stocks are rendered more plastic so that less power is consumed in the milling operation without, however, adversely affecting the modulus and tensile properties of the cured rubber products. The cured rubber exhibits an improved surface finish and more particularly a protected surface with a good "feel" and satisfactory appearance.

Obviously practice of this invention is not limited to the specific compositions given above, such compositions being merely illustrative of the manner of employing the anti-suncheckers of this invention. The preferred class of materials may be employed in different proportions than herein described and in conjunction with other rubber compositions than those specifically disclosed, for this invention is applicable generally to pure rubber or rubber compositions of the most varied nature.

It is to be understood that the method of improving a rubber as defined in the appended claims is a generic one and includes either the incorporating of the preferred class of materials into the rubber by milling or similar process, or their addition to the rubber latex before its coagulation, or the application thereof to the surface of a mass of crude or vulcanized rubber. The term "a rubber" is employed in the claims to define a vulcanizable plastic material which possesses high extensibility under load coupled with the property of forcibly retracting to approximately its original size and shape after the load is removed. Such products include, for example, india rubber, reclaimed rubber, balata, gutta percha and other natural or synthetic vulcanizable products whether or not admixed with fillers, pigments or accelerating agents.

The present invention is limited solely by the claims attached hereto as part of the present specification.

What is claimed is:

1. The method of improving the physical properties of a rubber which comprises incorporating therein from substantially 0.5 to 3.0 parts on the rubber of an improving agent comprising a diphenyl selected from the class consisting of diphenyl and nuclear substituted diphenyls wherein the substituents are selected from the class consisting of hydrocarbon radicals, nitro radicals and halogen radicals.

2. The method of improving the physical properties of natural rubber which comprises incorporating therein from substantially 0.5 to 3.0 parts on the rubber of an improving agent comprising a phenyl diphenyl.

3. The method of improving the physical properties of natural rubber which comprises incorporating therein from substantially 0.5 to 3.0 parts on the rubber of an improving agent comprising meta phenyl diphenyl.

4. The method of improving the physical properties of natural rubber which comprises incorporating therein from substantially 0.5 to 3.0 parts on the rubber of an improving agent comprising diphenyl.

5. The method of improving the physical properties of natural rubber which comprises incorporating therein from substantially 0.5 to 3.0 parts on the rubber of an improving agent comprising deca chlor diphenyl.

6. The method of making an improved vulcanized rubber product which comprises incorporating into a rubber vulcanizing ingredients and from substantially 0.5 to 3.0 parts on the rubber of a diphenyl selected from the class consisting of diphenyl and nuclear substituted diphenyls wherein the substituents are selected from the class consisting of hydrocarbon radicals, nitro radicals and halogen radicals and heating the mixture.

7. The vulcanized rubber product obtained by incorporating into a rubber, vulcanizing ingredients and from substantially 0.5 to 3.0 parts on the rubber of a diphenyl selected from the class consisting of diphenyl and nuclear substituted diphenyls wherein the substituents are selected from the class consisting of hydrocarbon radicals, nitro radicals and halogen radicals and heating the mixture.

8. The vulcanized rubber product obtained by incorporating into a rubber, vulcanizing ingredients and from substantially 0.5 to 3.0 parts on the rubber of a diphenyl containing at least one nuclear hydrocarbon substituent and heating the mixture.

9. The vulcanized rubber product obtained by incorporating into natural rubber, vulcanizing ingredients and from substantially 0.5 to 3.0 parts on the rubber of a phenyl diphenyl and heating the mixture.

10. The vulcanized rubber product obtained by incorporating into natural rubber, vulcanizing ingredients and from substantially 0.5 to 3.0 parts on the rubber of meta phenyl diphenyl and heating the mixture.

11. The vulcanized rubber product obtained by incorporating into natural rubber, vulcanizing ingredients and from substantially 0.5 to 3.0 parts on the rubber of diphenyl and heating the mixture.

12. The vulcanized rubber product obtained by incorporating into natural rubber, vulcanizing ingredients and from substantially 0.5 to 3.0 parts on the rubber of deca chlor diphenyl and heating the mixture.

13. The method of improving the physical properties of a rubber which comprises incorporating into the rubber from substantially 0.5 to 3.0 parts on the rubber of diphenyl in admixture with a hydrocarbon wax.

14. The method of improving the physical properties of a rubber which comprises incorporating into the rubber from substantially 0.5 to 3.0 parts of diphenyl in admixture with paraffin wax.

ROBERT L. SIBLEY.